(12) United States Patent
Moore

(10) Patent No.: US 6,234,262 B1
(45) Date of Patent: May 22, 2001

(54) SNOWMOBILE STEERING AND SUSPENSION SYSTEM

(76) Inventor: John W. Moore, Rte. 1, P.O. Box 127, Mason, WI (US) 54856

( * ) Notice: Subject to any disclaimer, the term of this patent is extended or adjusted under 35 U.S.C. 154(b) by 0 days.

(21) Appl. No.: 09/440,008

(22) Filed: Nov. 12, 1999

Related U.S. Application Data

(60) Provisional application No. 60/108,275, filed on Nov. 12, 1998.

(51) Int. Cl.[7] .................................................. B62M 9/00
(52) U.S. Cl. .......................... 180/182; 180/186; 180/190; 280/93.51
(58) Field of Search ..................................... 180/182, 186, 180/190; 280/92.502, 93.51, 93.512

(56) References Cited

U.S. PATENT DOCUMENTS

| | | | |
|---|---|---|---|
| 3,145,030 | 8/1964 | Millis | 180/182 |
| 3,608,658 | 9/1971 | Woodfill et al. | 180/182 |
| 3,734,219 | 5/1973 | Christensen et al. | 180/182 |
| 3,760,895 | * 9/1973 | Martinmaas | 180/190 |
| 3,777,831 | 12/1973 | Hale | 180/182 |
| 3,847,239 | 11/1974 | Copeland | 180/182 |
| 3,884,314 | * 5/1975 | Callaway | 180/9.54 |
| 4,337,958 | * 7/1982 | Witt et al. | 180/16 |
| 4,364,447 | * 12/1982 | Yoshida | 180/182 |
| 4,489,954 | * 12/1984 | Yasui et al. | 180/21 R |
| 4,671,521 | 6/1987 | Talbot et al. | 180/182 |
| 4,796,902 | 1/1989 | Capra | 180/182 |
| 5,029,664 | * 7/1991 | Zulawski | 180/190 |
| 5,033,572 | * 7/1991 | Zulawski | 180/190 |
| 5,038,882 | * 8/1991 | Zulawski | 180/190 |
| 5,305,844 | * 4/1994 | Ducote | 180/24.01 |
| 5,364,114 | * 11/1994 | Petersen | 280/95.1 |
| 5,660,245 | * 8/1997 | Marier et al. | 180/190 |
| 5,820,147 | * 10/1998 | Rohweder et al. | 280/93.51 |
| 6,009,966 | * 1/2000 | Olson et al. | 180/182 |

* cited by examiner

*Primary Examiner*—Eric Culbreth
*Assistant Examiner*—L. Lum
(74) *Attorney, Agent, or Firm*—Richard C. Conover

(57) ABSTRACT

A steering and suspension system for snowmobiles including a steering linkage connecting a steering handle with a steering spindle on each ski for causing an outside ski during a turn to move outwardly from the snowmobile and the inside ski to move inwardly toward the snowmobile and further including a pair of shock absorbers each connected between the steering linkage and a ski.

8 Claims, 6 Drawing Sheets

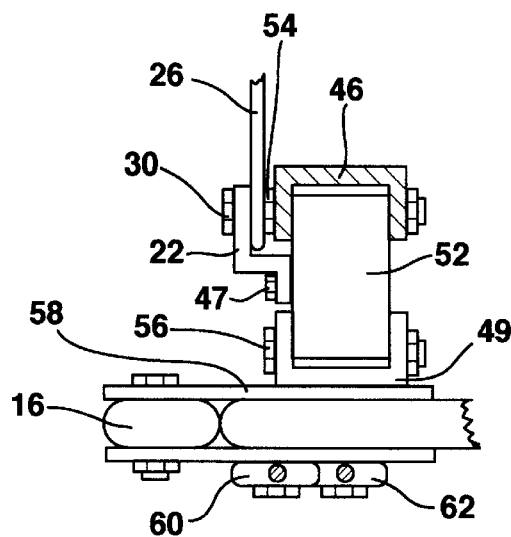
FIG. 4
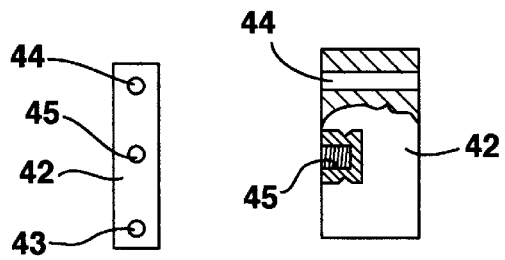
FIG. 6  FIG. 5
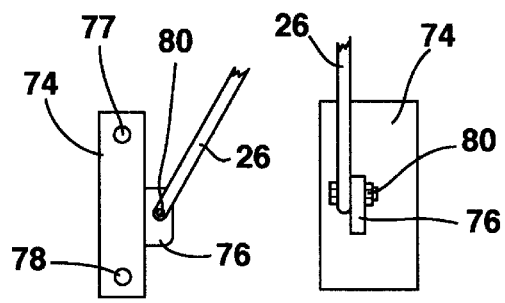
FIG. 12  FIG. 11

SNOWMOBILE STEERING AND SUSPENSION SYSTEM

This application claims the benefit of Provisional No. 60/108,275 filed Nov. 12, 1998.

BACKGROUND OF THE INVENTION

This invention relates to a steering and suspension system for a snowmobile which moves the center of gravity of the skis toward the inside of a turn to place additional pressure on an inside ski when turning. This lessens the necessity of the snowmobile operator to lean into the turn.

Several previous patents have illustrated means for stabilizing a snowmobile during a turn. For example, U.S. Pat. No. 3,608,658 to Woodfill and U.S. Pat. No. 3,777,831 to Hale describe mechanisms for tilting the snowmobile during a turn. U.S. Pat. No. 3,847,239 to Copeland describes a steering mechanism for snowmobiles which moves the snowmobile body over the skis in a direction opposite the turning direction to stabilize the snowmobile during the turn.

The present invention is directed to a steering and suspension system that can be used with modern snowmobiles to stabilize the snowmobile during a turn. The present invention may be incorporated into the existing suspension system of conventional snowmobiles.

SUMMARY OF INVENTION

A suspension mounting device is mounted on a modern snowmobile having a frame with shock absorbers, fixed length tie rods and trailing brace arms extending between the snowmobile frame and a pair of skis. The skis have conventional steering spindles affixed thereto which may be pivotally turned to turn the snowmobile skis.

A suspension mount of the present invention is mounted for moving substantially horizontally across the frame in response to turning movements of the steering handlebars. A pair of pitman arms is provided, each of which have one end fixedly attached to a respective steering spindle. These fixed length tie rods have one end connected to a respective free end of a pitman arm. The opposite ends of these fixed length tie rods are connected to the snowmobile frame on the centerline of the snowmobile.

With the present invention, the shock absorbers are connected between the frame and the trailing brace arms. Radius rods extend between the suspension mount and the trailing brace arms. As the suspension mount moves horizontally across the frame, the radius arms move the spindles horizontally in the same direction. This causes the skis to turn in the opposite direction because the tie rods, which are connected to the ends of the pitman arms that are furthest removed ahead of the spindle, are anchored and are of fixed length. These tie rods do not move horizontally even though the spindles do move in a direction opposite the turn. This movement inherently shifts the weight of the snowmobile toward the inside of a turn.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 4 is an enlarged right end view of the suspension mount shown in FIG. 2;

FIG. 5 is an elevational view of a steering arm shown in FIG. 4 with parts broken away;

FIG. 6 is a left end view of the steering arm shown in FIG. 5;

FIG. 11 is an elevational view of a bellcrank used with a second embodiment of the invention; and FIG. 12 is a left end view of the bellcrank shown in FIG. 11.

DESCRIPTION OF A PREFERRED EMBODIMENT

Figure 1:
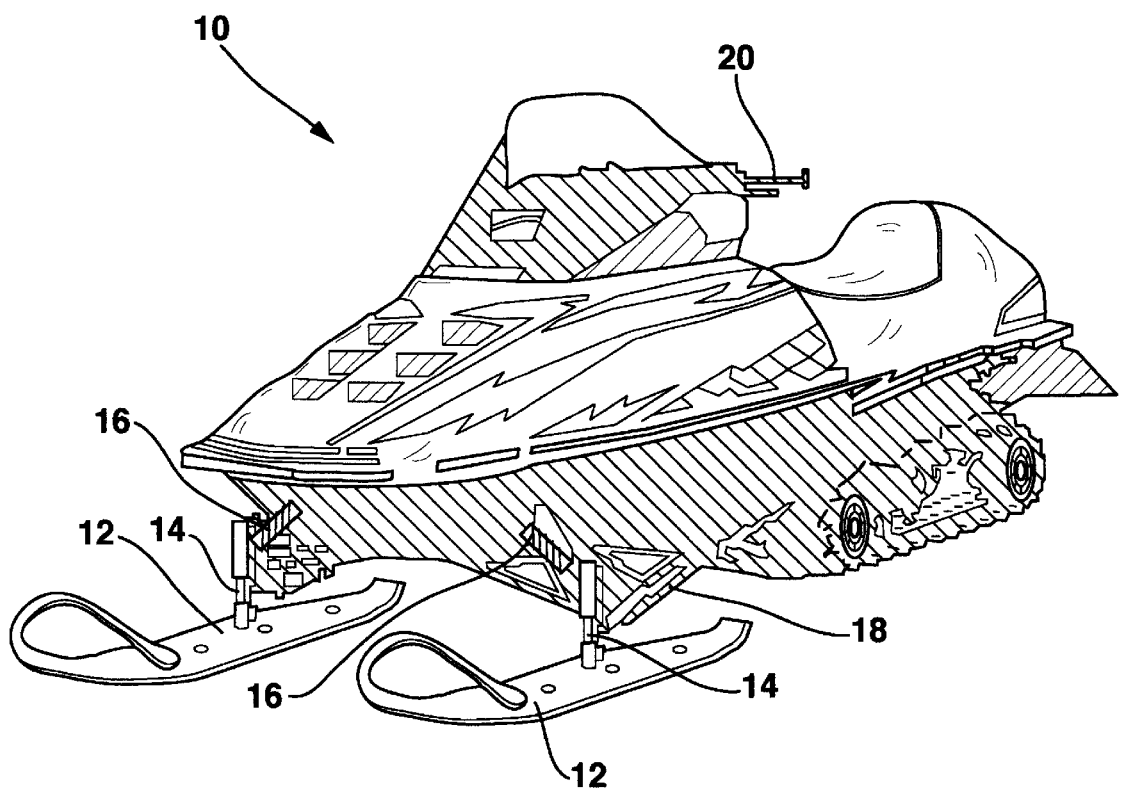
FIG. 1 is a perspective view of a conventional snowmobile.

A conventional snowmobile 10 is shown in FIG. 1. The snowmobile 10 includes a pair of skis 12, each of which have an upright steering spindle 14. With this conventional snowmobile, a shock absorber 16 and a trailing brace arm 18 are provided to support the frame of the snowmobile over the skis. Handle bars 20 are used to steer the skis.

The present invention is shown in FIGS. 2–10. Handlebars 20 are connected to a bellcrank 22 in a conventional manner with linkage 24 and drag linkage 26, as shown in these Figs.

Figure 2:
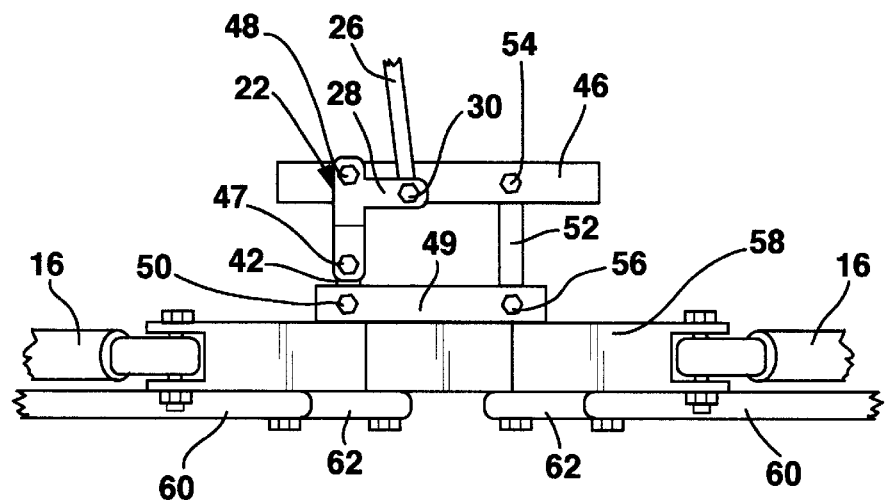
FIG. 2 is a plan view of a suspension mount in the present invention with attached components broken away.
Figure 7:
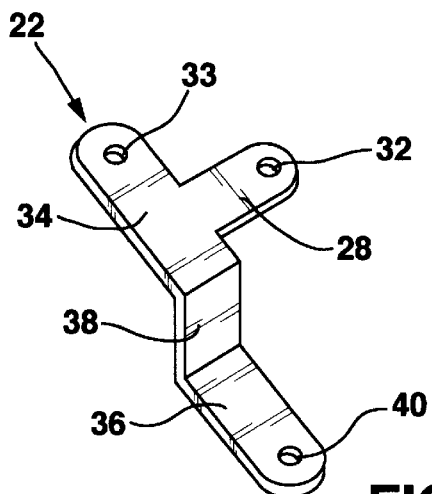
FIG. 7 is a perspective view of a bellcrank shown in FIG. 2.

Bellcrank 22 is shown in FIGS. 2–4 and 7–10. Drag linkage 26 is rotatably pinned to a crank arm 28 of bellcrank 22 with a bolt 30 extending through hole 32 of bellcrank 22, as shown in FIGS. 2 and 4. The crank arm 28 of bellcrank 22 is formed in one piece with a body portion 34 having a mounting hole 33, as shown in FIG. 7. A bearing sleeve (not shown) is carried in hole 33. An offset arm 36 is connected to body portion 34 through bent wall 38. Offset arm 36 includes a mounting hole 40 drilled through the offset arm.

Offset arm 36 is fixedly bolted to a steering arm 42 with bolt 47 extending into a bolt accepting hole 45 located at the top of the steering arm as best seen in FIG. 5. Steering arm 42 is a rectilinear member with holes 43 and 44 located at opposite ends and with bolt accepting hole 45 positioned intermediate holes 43 and 44, as best seen in FIG. 6.

One end of steering arm 42 is bolted to a bulkhead 46 of snowmobile 10 with a bolt 48 which extends through hole 33 of bellcrank 22, a corresponding hole in bulkhead 46, and a hole 44 of steering arm 42, to hold together steering arm 42, bellcrank 22, and bulkhead 46. The other end of steering arm 42 is bolted to a U-channel 49 with a bolt 50 passing through a hole in U-channel 49 and the hole 43 of the steering arm.

A second steering arm 52 is provided as shown in FIG. 2. Steering arm 52 is shaped similarly to steering arm 42, but constructed without bolt accepting hole 45. Steering arm 52 is bolted between bulkhead 46 and U-channel 50 with elongate bolts 54 and 56 respectively, as shown in FIG. 2. Bearing sleeves (not shown) are inserted in all the holes through which bolts 30, 48, 50, 54 and 56 are inserted. All of the bolts 30, 48, 50, 54, and 56 are tightened sufficiently to hold the parts together, but still permit rotational movement of the connected parts around the bolts.

U-channel 49 is secured to a suspension mount 58 as by welding. With this structure, U-channel 49 and suspension mount 58 move left or right relative to the bulkhead 46, as shown in FIGS. 8–10 under control of pivoting movement of steering arms 42 and 52.

Figure 3:
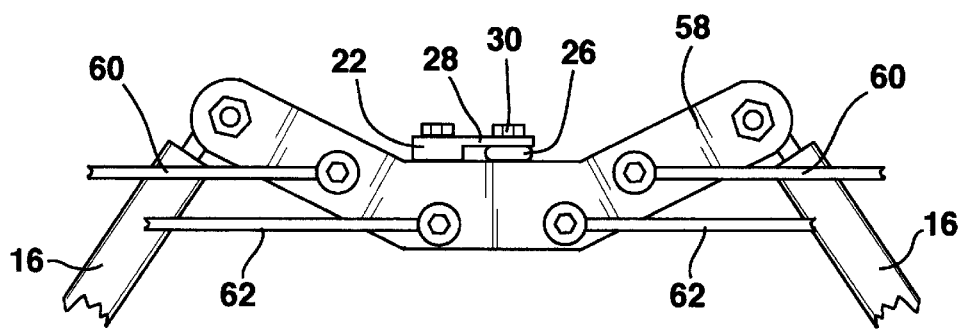
FIG. 3 is an elevational view of the suspension mount shown in FIG. 2.
Figure 8:
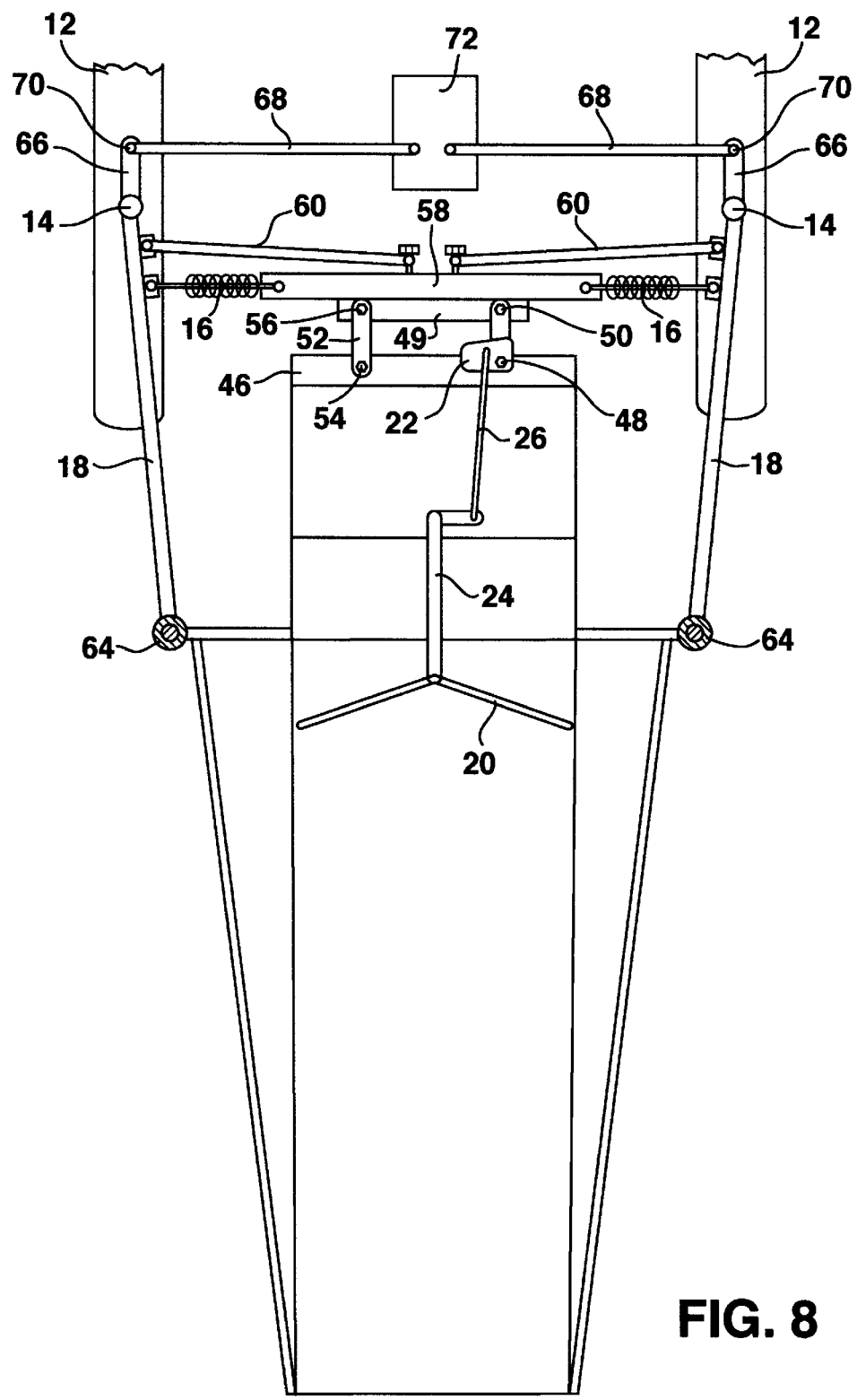
FIG. 8 is a schematic plan view of a part of a snowmobile steering and suspension system according to the present invention.
Figure 9:
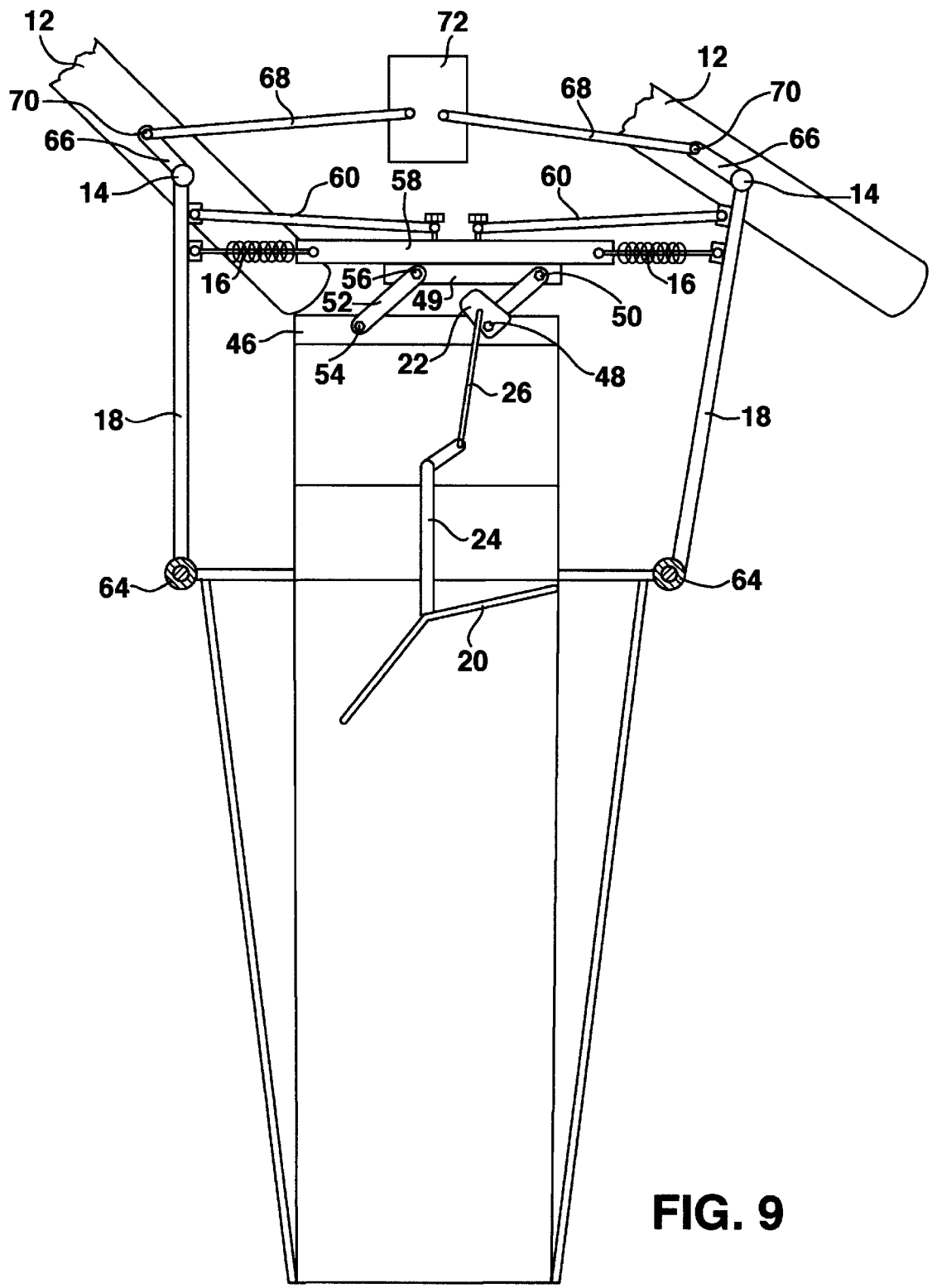
FIG. 9 is a schematic plan view of the system shown in FIG. 8 with a snowmobile making a left turn.
Figure 10:
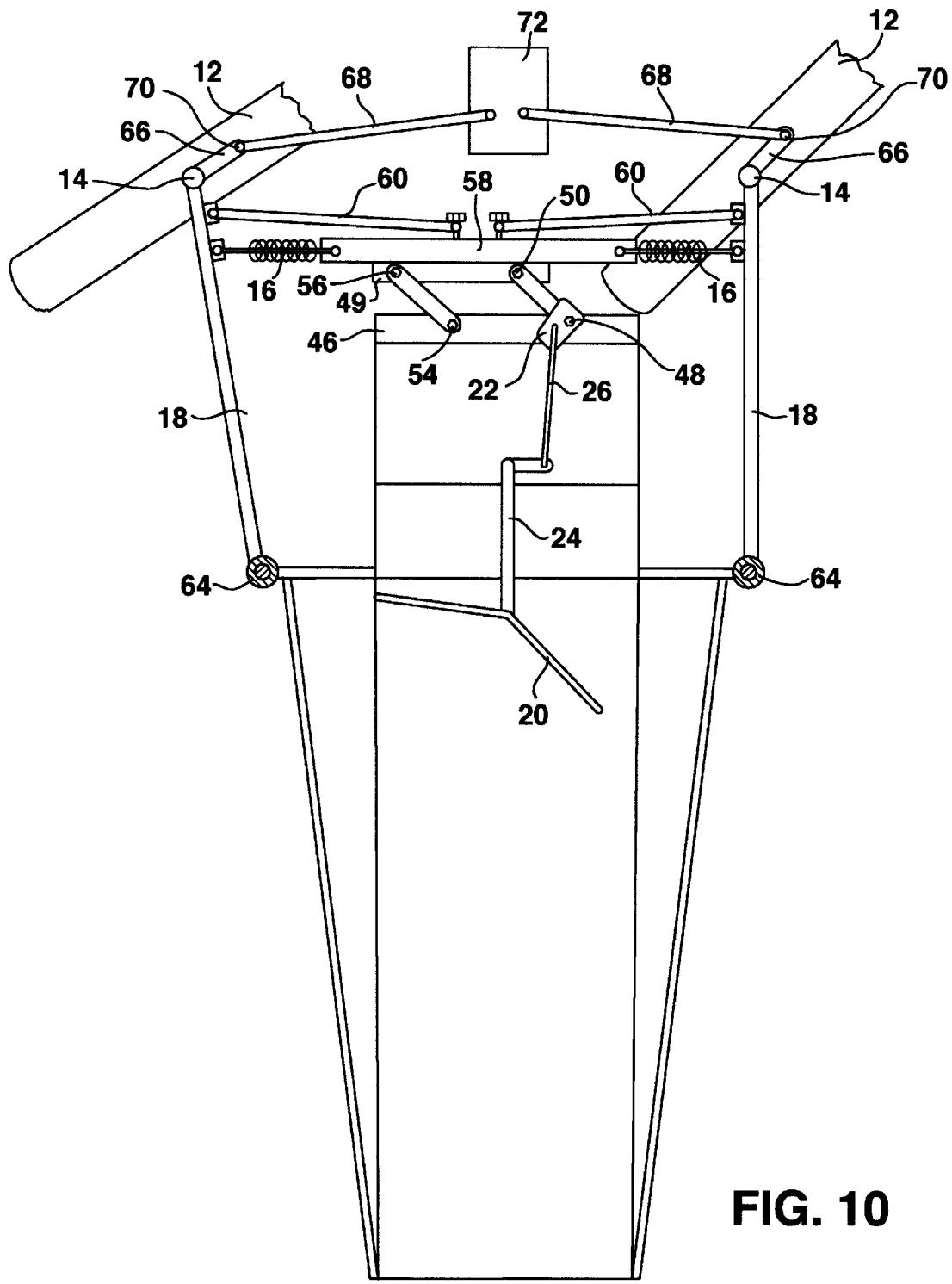
FIG. 10 is a schematic plan view of the system shown in FIG. 8 with a snowmobile making a right turn.

Shock absorbers 16, each have one end connected to suspension mount 58 and the other end connected to trailing arm 18, as shown schematically in FIGS. 8–10. A pair of upper radius rods 60 each have one end connected to suspension mount 58, as shown in FIGS. 2–4, and the other end attached to trailing arm 18, again as shown schematically in FIGS. 8–10. In the same way, a pair of lower radius rods 62 each have one end connected to suspension mount 58, as shown in FIG. 3, and the other end connected to trailing arm 18.

Steering spindle 14, as shown in FIG. 1, has one end fixedly attached to ski 12 in a conventional manner. Trailing brace arm 18 includes a forward end which pivotally receives spindle 14, shown schematically in FIGS. 8–10. The rearward end of trailing arm 18 is pivotally attached to a snowmobile frame, as at pivotal connection 64, again shown schematically in FIGS. 8–10.

A pair of pitman arms 66 are each rigidly attached to an upper end of spindles 14 at a position which is spaced apart from skis 12. The opposite end of each pitman arm 66 is pivotally attached to a tie rod 68 at pivotal connection 70, as schematically shown in FIGS. 8–10. Each of the tie rods have their distal ends pivotally connected to a plate 72 which is fixedly attached on center line to the snowmobile nosepan, which in turn is fixedly attached to the frame of the snowmobile.

In operation, during a snowmobile turn, handlebars 20 are pivoted in the direction of the desired turn. This movement pivots bellcrank 22 through linkages 24 and 26, which in turn pivots steering arms 42 and 52 in a direction opposite to the turn. Because of the mechanical parallelogram provided by the connection of steering arms 42 and 52 with bulkhead 46 and U-channel 49, suspension mount 58 translates sideways, as shown in FIGS. 9 and 10. The upper and lower radius rods 60 and 62 pivot trailing arms 18, as shown in FIGS. 9 and 10, in a direction opposite to the turn. Since pitman arms 66 are fixedly mounted to spindle 14, and tie rods 68 are of fixed length, the skis 12 will be turned about the spindle 14 in the direction of the turn, as shown in FIGS. 9 and 10. Tie rods 68 through pitman arms 66 turn spindles 14, thereby causing ski 12 to rotate. This movement also causes trailing arms 18 to pivot in a direction opposite the turn to move the center of gravity of the snowmobile body over the skis toward the inside of the turn.

A second embodiment of the invention modifies bellcrank 22 and eliminates steering arm 42 to tie drag linkage 26 directly to the suspension mount 58. As shown in FIGS. 11 and 12, modified bellcrank 74 includes a flange 76 with a bolt hole (not shown) drilled through the flange. A bolt 80 extends through this hole to pivotally secure drag linkage 26 to flange 76 of bellcrank 74 as best seen in FIG. 12. Bellcrank 74 includes a hole 77 through which bolt 48 is inserted to rotatably secure bellcrank 74 to bulkhead 46. Bellcrank 74 further includes a hole 78 through which bolt 50 is inserted to secure bellcrank 74 to U-channel 49. With this embodiment, bellcrank 74 takes the place of bellcrank 22 and steering arm 42 of the first embodiment. Operationally, the rest of the invention functions in the same manner as in the first embodiment.

A significant benefit can be attributed to the steering and suspension system described above. It is highly relevant that the center of gravity of the snowmobile is shifted toward the inside of the turn whenever handlebars 20 are pivoted into the turn. This has the effect of positioning the weight of the snowmobile more nearly over the inside ski during a turn. Hence, the operator no longer needs to lean into a turn when making a turn. Also, the outside ski is moved further away horizontally from the front of the snowmobile, which provides added stability.

It can also be appreciated that a power steering unit could be used as a linkage between handlebars 20 and suspension mount 58 to provide power assistance to make the steering of snowmobile 10 easier.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. In a snowmobile, a steering and suspension system connecting a frame of the snowmobile to a pair of skis supporting the snowmobile comprising:

a steering handle means pivotally connected to one arm of a rotatable bellcrank pivotally mounted to the frame of the snowmobile for turning the snowmobile;

a suspension mount member;

a steering arm means for pivotally connecting the suspension mount member to a second arm of the bellcrank for causing the suspension mount to move substantially rectilinearly crosswise of the snowmobile in a direction opposite a turn when the bellcrank is rotated;

an upright steering spindle fixedly attached to each ski;

a pair of pitman arms, each having one end fixedly attached to a respective steering spindle;

a pair of trailing brace arms, each having one end pivotally connected to the frame of the snowmobile, and having an opposite end pivotally connected to a respective steering spindle;

a pair of fixed length tie rods, each having one end pivotally connected to a free end of a respective pitman arm, and an opposite end connected to the frame of the snowmobile; and a pair of radius rods each having one end pivotally connected to the suspension mount member, and an opposite end connected to a respective trailing brace arm.

2. The steering and suspension system according to claim 1, further including a pair of shock absorbers each having one end pivotally connected to the suspension mount, and having an opposite end pivotally connected to a respective trailing brace arm.

3. In a snowmobile, a steering and suspension system connecting a frame of the snowmobile to a pair of skis supporting the snowmobile comprising:

a steering handle connected to an arm member which is rotated by turning the steering handle;

a suspension mount member;

a steering arm means for pivotally connecting the suspension mount member to the arm member for causing the suspension mount to move substantially rectilinearly crosswise of the snowmobile in a direction opposite a turn when the arm member is rotated;

an upright steering spindle fixedly attached to each ski;

a pair of pitman arms, each having one end fixedly attached to a respective steering spindle;

a pair of trailing brace arms, each having one end pivotally connected to the frame of the snowmobile, and having an opposite end pivotally connected to a respective steering spindle;

a pair of fixed length tie rods, each having one end pivotally connected to a free end of a respective pitman arm, and an opposite end connected to the frame of the snowmobile; and a pair of radius rods each having one end pivotally connected to the suspension mount member, and an opposite end connected to a respective trailing brace arm.

4. The steering and suspension system according to claim 3, further including a pair of shock absorbers each having one end pivotally connected to the suspension mount, and having an opposite end pivotally connected to a respective trailing brace arm.

5. In a snowmobile, a steering and suspension system connecting a frame of the snowmobile to a pair of skis supporting the snowmobile comprising:

a pitman arm for each ski having a first end fixedly attached to a steering spindle attached to the ski, and having a free second end oriented in a direction toward a tip of the ski;

a tie rod for each ski having a first end pivotally attached to the frame and a second end pivotally attached to the free end of the pitman arm associated with a ski;

a trailing brace arm for each ski having a first end pivotally attached to the steering spindle attached to the ski, and a second opposite end pivotally attached to the frame of the snowmobile in a trailing position;

a steering arm having a first end pivotally attached to the frame of the snowmobile, and having a free second end;

a radius rod for each ski having a first end pivotally attached to the free end of the steering arm, and a second end pivotally attached to the trailing brace arm associated with each ski at a position spaced apart from the steering spindle;

the radius rod and tie rod associated with each ski are positioned in a substantially parallel relation with the tie rod positioned forwardly of the radius rod; and a steering handle including having linkage connected to the steering arm for pivotally rotating the steering arm with respect to the frame whereby when the steering handle is turned in one direction, the steering spindles associated with each ski are turned in the same direction, and the radius rods associated with the ski move substantially crosswise of the snowmobile in an opposite direction.

6. The steering and suspension system according to claim 5, further including a pair of shock absorbers each having one end pivotally connected to the suspension mount, and having an opposite end pivotally connected to a respective trailing brace arm.

7. In a snowmobile, a steering and suspension system connecting a frame of the snowmobile to a pair of skis supporting the snowmobile comprising:

a steering handle connected to an arm member which is rotated by turning the steering handle;

a suspension mount member;

a steering arm means for pivotally connecting the suspension mount member to the arm member for causing the suspension mount to move substantially rectilinearly crosswise of the snowmobile in a direction opposite a turn when the arm member is rotated;

an upright steering spindle fixedly attached to each ski;

a pair of pitman arms, each having one end fixedly attached to a respective steering spindle;

a pair of fixed length tie rods, each having one end pivotally connected to a free end of a respective pitman arm, and an opposite end connected to the frame of the snowmobile; and a pair of radius rods each having one end pivotally connected to the suspension mount member, and an opposite end connected to a respective steering spindle.

8. The steering and suspension system according to claim 7, further including a pair of shock absorbers each having one end pivotally connected to the suspension mount, and having an opposite end pivotally connected to a respective steering spindle.

* * * * *